(12) United States Patent  
Fan et al.

(10) Patent No.: US 7,701,725 B2  
(45) Date of Patent: Apr. 20, 2010

(54) COMPUTER SYSTEM WITH RISER CARD

(75) Inventors: Chen-Lu Fan, Taipei Hsien (TW); Yi-Lung Chou, Taipei Hsien (TW); Li-Ping Chen, Taipei Hsien (TW); Yu-Feng Hung, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 184 days.

(21) Appl. No.: 11/778,097

(22) Filed: Jul. 16, 2007

(65) Prior Publication Data

US 2008/0298030 A1  Dec. 4, 2008

(30) Foreign Application Priority Data

Jun. 1, 2007  (CN)  .................... 2007 2 0200440 U

(51) Int. Cl.  
*H01R 12/16* (2006.01)

(52) U.S. Cl. .................. 361/785; 361/752; 361/790

(58) Field of Classification Search ................ 361/785, 361/825, 683–688, 788, 752, 790, 800; 312/223  
See application file for complete search history.

(56) References Cited

U.S. PATENT DOCUMENTS

| | | | |
|---|---|---|---|
| 5,963,431 A * | 10/1999 | Stancil | 361/803 |
| 6,261,104 B1 | 7/2001 | Leman | |
| 6,317,318 B1 * | 11/2001 | Kim | 361/679.33 |
| 6,404,624 B1 * | 6/2002 | Jeong | 361/679.41 |
| 6,542,384 B1 * | 4/2003 | Radu et al. | 361/818 |
| 6,556,434 B1 * | 4/2003 | Chan et al. | 361/679.33 |
| 6,580,606 B1 * | 6/2003 | Leman | 361/679.33 |
| 7,123,470 B2 * | 10/2006 | Hsu et al. | 361/679.02 |
| 7,301,777 B2 * | 11/2007 | Fan et al. | 361/754 |
| 7,433,198 B2 * | 10/2008 | Fan et al. | 361/752 |
| 2003/0016496 A1 * | 1/2003 | Kim et al. | 361/695 |
| 2008/0106862 A1 * | 5/2008 | Liang | 361/686 |

* cited by examiner

*Primary Examiner*—Hung S Bui  
(74) *Attorney, Agent, or Firm*—Frank R. Niranjan

(57) ABSTRACT

A computer system includes a chassis (10) having a bottom plate (12), a drive bracket (20) for securing at least one data storage device therein, a motherboard (40), and a riser card (30). The drive bracket is secured in the chassis above the bottom plate, and has a sidewall (203) perpendicular to the bottom plate of the chassis. The motherboard is secured on the bottom plate of the chassis forming a socket (41) thereon. The riser card electrically engages in the socket of the motherboard, and is secured on the sidewall of the drive bracket.

6 Claims, 3 Drawing Sheets

COMPUTER SYSTEM WITH RISER CARD

BACKGROUND

1. Technical Field

The present invention relates to computer systems, and more particularly to a computer system with a riser card secured therein.

2. General Background

In a computer system, a motherboard with sockets formed thereon is secured in a chassis. The sockets are usually used to secure AGP (Accelerated Graphics Port) cards or PCI-E (Peripheral Component Interconnect Express) cards for expanding functions of the computer system. However, the sockets of different motherboards are predetermined, and do not fit different types of AGP cards or PCI-E cards. So, a riser card is usually provided to transform the sockets to fit different types of AGP cards or PCI-E cards.

In order to stably secure the riser card, a securing plate is formed in the chassis between side plates thereof. The riser card is fixed on the securing plate with screws after the riser card is inserted into the socket of the motherboard, so that the riser card is stably secured in the chassis. Unfortunately, the securing plate takes up additional space in the chassis. Therefore, if the riser card is not needed, the space taken up by the securing plate is wasted.

What is needed, therefore, is a computer system with a mounting apparatus for securing a riser card in a chassis without wasting space.

SUMMARY

A computer system includes a chassis having a bottom plate, a drive bracket for securing at least one data storage device therein, a motherboard, and a riser card. The drive bracket is secured in the chassis above the bottom plate, and has a sidewall perpendicular to the bottom plate of the chassis. The motherboard is secured on the bottom plate of the chassis forming a socket thereon. The riser card electrically engages in the socket of the motherboard, and is secured to the sidewall of the drive bracket.

Other advantages and novel features will be drawn from the following detailed description of preferred embodiments with attached drawings, in which:

DETAILED DESCRIPTION OF PREFERRED EMBODIMENTS

Figure 1:
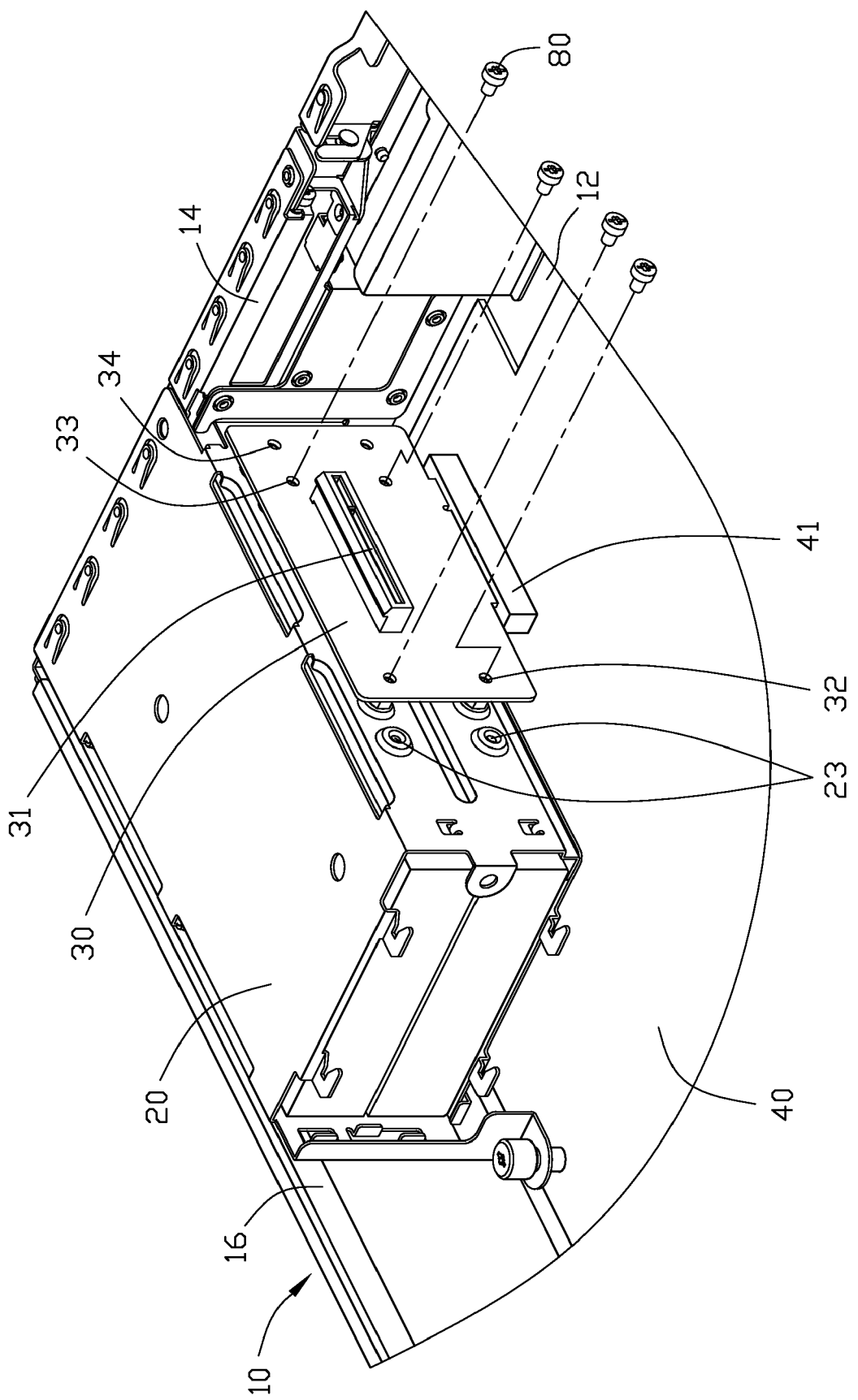
FIG. 1 is an isometric view of a computer system in accordance with a preferred embodiment of the present invention, the computer system including a chassis, a drive bracket, a motherboard, and a riser card.

Referring to FIG. 1, a computer system in accordance with an embodiment of the present invention includes a chassis 10, a drive bracket 20, a motherboard 40 having a socket 41 formed thereon, and a riser card 30.

The chassis 10 includes a bottom plate 12, a front plate 14, and a side plate 16. The front plate 14 and the side plate 16 are perpendicularly bent from adjacent edges of the bottom plate 12.

Figure 2:
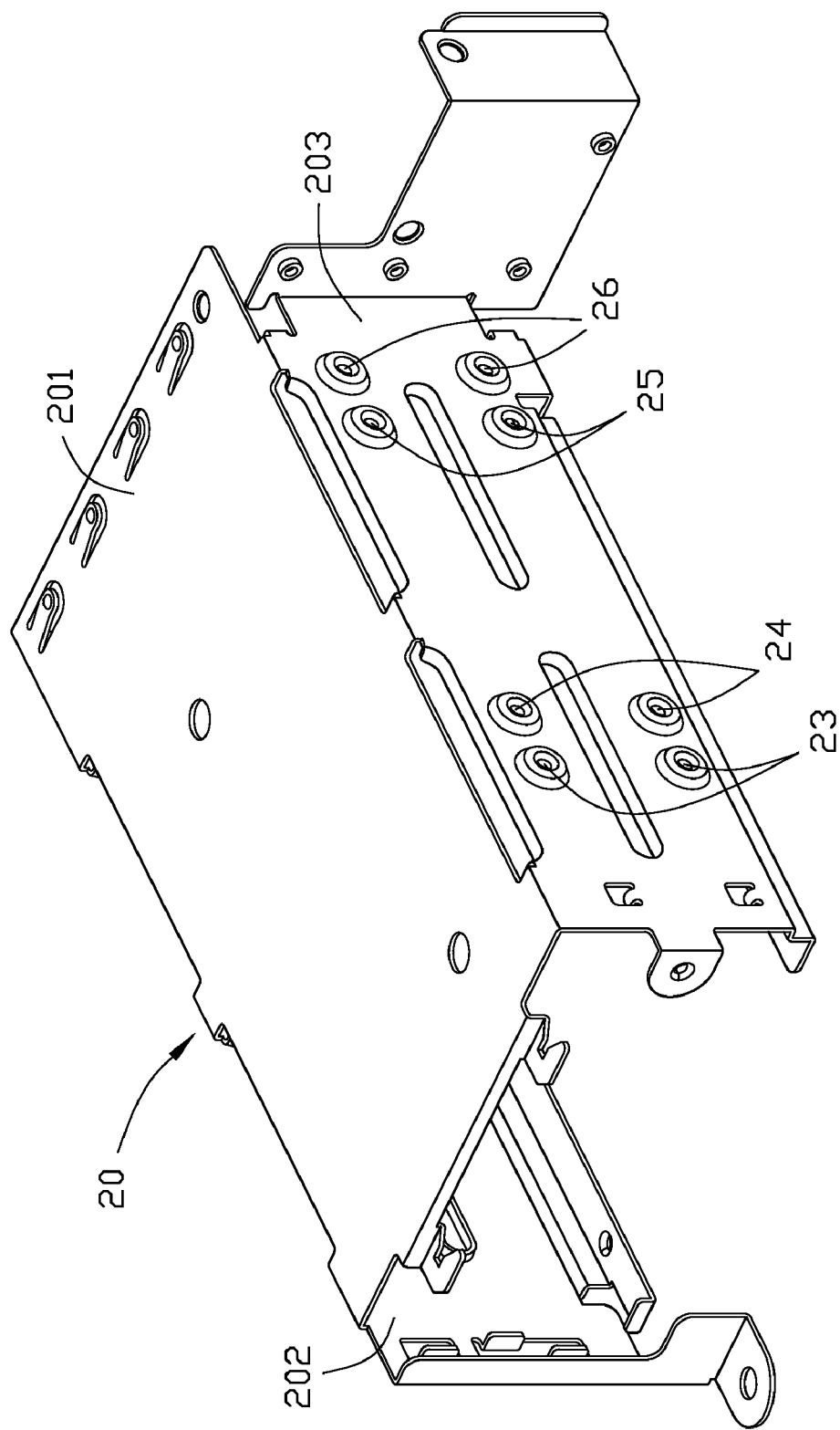
FIG. 2 is an isometric view of the drive bracket of FIG. 1.

Referring to FIG. 2, the drive bracket 20 defines a space therein for receiving disk drives (not labeled), such as hard disk drives, compact disc read-only memory drives and so on, and includes a top wall 201, and two parallel sidewalls 202, 203 respectively bent perpendicularly from opposite edges of the top wall 201. The space of the drive bracket 20 is surrounded by the top wall 201 and the sidewalls 202, 203. The sidewall 203 defines four pairs of securing holes 23, 24, 25, and 26 therein.

Referring to FIG. 1, the riser card 30 has an inserting portion (not labeled) for electrically engaging in the socket 41 of the motherboard 40, and a socket 31 formed thereon for electrically receiving an inserting portion of an AGP card or a PCI-E card. The riser card 30 defines three pairs of through holes 32, 33, and 34 therein.

Referring also to FIG. 1, the motherboard 40 is mounted on the bottom plate 12 of the chassis 10. The drive bracket 20 is secured in the chassis 10 above the motherboard 40, and abuts on the front plate 14 and the side plate 16. The sidewall 203 is perpendicular to the bottom plate 12 of the chassis 10 and the motherboard 40. The inserting portion of the riser card 30 is inserted into the socket 41 of the motherboard 40, so that the riser card 30 is perpendicular to the motherboard 40 and the bottom plate 12 of the chassis 10. The pairs of through holes 32, 33, and 34 respectively align with the corresponding pairs of securing holes 24, 25, and 26 of the sidewall 203 of the drive bracket 20. A plurality of fixing members 80 is inserted through the pairs of through holes 32, 33 respectively, to engage in the corresponding pairs of securing holes 24, 25, thereby stably securing the riser card 30 on the sidewall 203 of the drive bracket 20.

Figure 3:
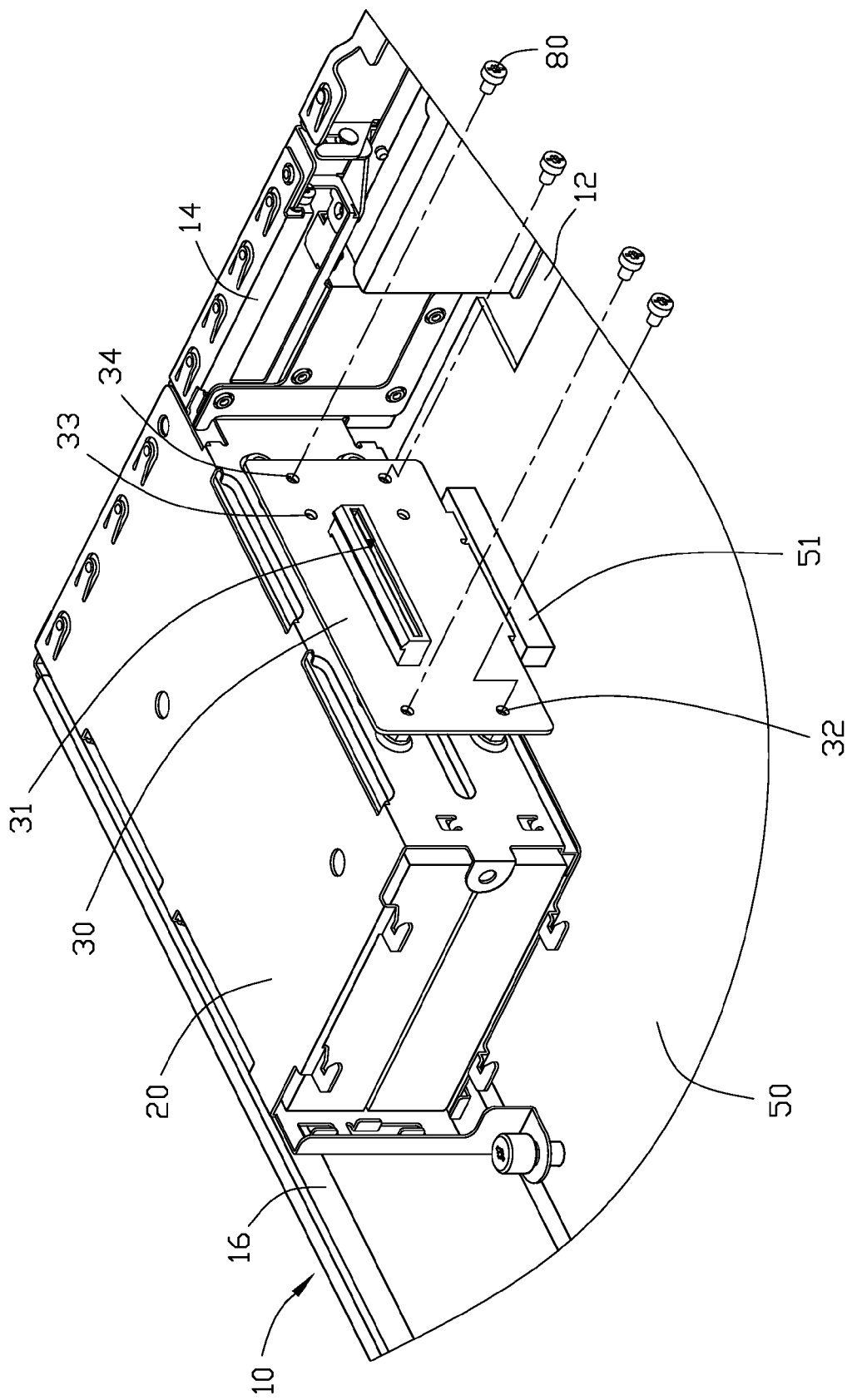
FIG. 3 is similar to FIG. 1, but showing the motherboard of FIG. 1 replaced by another motherboard defining a socket having a position different from a socket formed on the motherboard of FIG. 1.

Referring also to FIG. 3, another motherboard 50 with a socket 51 formed thereon is provided. The socket 51 has a position different from the socket 41 of the motherboard 40. When the riser card 30 is inserted in the socket 51, the pairs of through holes 3234 respectively align with the pairs of securing holes 23, 25 of the sidewall 203 of the drive bracket 20. The fixing members 80 are respectively inserted through the pairs of through holes 32, 34 to engage in the pairs of securing holes 23, 25, thereby stably securing the riser card 30 on the sidewall 203 of the drive bracket 20.

In this embodiment, the chassis 10 is capable of accommodating different types of motherboards 40, 50, which have sockets 41, 51 in different positions. The drive bracket 20 is used to stably secure the riser card 30 thereon, thereby taking full advantage of space in the chassis.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer system, comprising:
   a chassis having a bottom plate and a side plate perpendicular to the bottom plate;
   a drive bracket comprising a top wall and two parallel sidewalls perpendicularly bent from opposite edges of the top wall, the top wall being parallel to the bottom plate of the chassis, the sidewalls being parallel to the side plate of the chassis and configured for securing at least one data storage device therebetween, the drive bracket being secured in the chassis above the bottom plate;

a motherboard secured on the bottom plate of the chassis forming a socket thereon; and a riser card electrically engaging in the socket of the motherboard, and secured on one of the sidewalls of the drive bracket;

wherein the motherboard is secured between the bottom plate of the chassis and the drive bracket.

2. A computer system, comprising:

a chassis for mounting a given motherboard thereon, the given motherboard having a socket; and a drive bracket comprising a top wall and two parallel sidewalls perpendicular to the top wall, the top wall being parallel to the bottom given motherboard, the drive bracket being configured for securing at least one data storage device between the sidewalls, the drive bracket secured in the chassis and one of the sidewalls defining a plurality of securing holes therein;

a riser card defining a plurality of through holes therein, the riser card being adapted for mounted in the socket of a given motherboard; and a plurality of fixing members for extending through the through holes of the riser card and into the corresponding securing holes of the one sidewall of the drive bracket, the securing holes and the through holes being arranged in a manner such that the riser card can be secured on a plurality of locations on the one sidewall and a location of the riser card can be selected according to a location of the socket of the given motherboard.

3. The computer system as described in claim 2, wherein the chassis comprises a bottom plate for securing the given motherboard thereon, the one sidewall of the drive bracket being perpendicular to the bottom plate of the chassis.

4. The computer system as described in claim 3, wherein the motherboard is positioned between the drive bracket and the bottom plate.

5. The computer system as described in claim 2, wherein the chassis further comprises a front plate formed perpendicularly on a front edge of the bottom plate, the drive bracket being secured on the front plate, the one sidewall of the drive bracket being perpendicular to the front plate.

6. A computer system, comprising:

a chassis having a bottom plate and a front plate perpendicular to the bottom plate;

a drive bracket comprising a top wall and two parallel sidewalls perpendicular to opposite edges of the top wall, the top wall being parallel to the bottom plate of the chassis, the sidewalls being perpendicular to the front plate of the chassis, the drive bracket securing at least one data storage device between the sidewalls and being secured in the chassis above the bottom plate;

a motherboard secured on the bottom plate of the chassis forming a socket thereon; and a riser card electrically engaging in the socket of the motherboard, and secured on one of the sidewalls of the drive bracket;

wherein the one sidewall of the drive bracket defines pairs of securing holes therein, the riser card defines pairs of through holes therein, a plurality of fixing members are inserted through the pairs of through holes to engage in the corresponding pairs of securing holes thereby stably securing the riser card on the one sidewall of the drive bracket; and the securing holes and the through holes are arranged in a manner such that the riser card can be secured on a plurality of locations on the one sidewall of the drive bracket, and a location of the riser card can be selected according to a location of the socket of the motherboard.

* * * * *